(No Model.)
R. F. GILLIN.
ROTARY MEASURE.
No. 468,318. Patented Feb. 2, 1892.
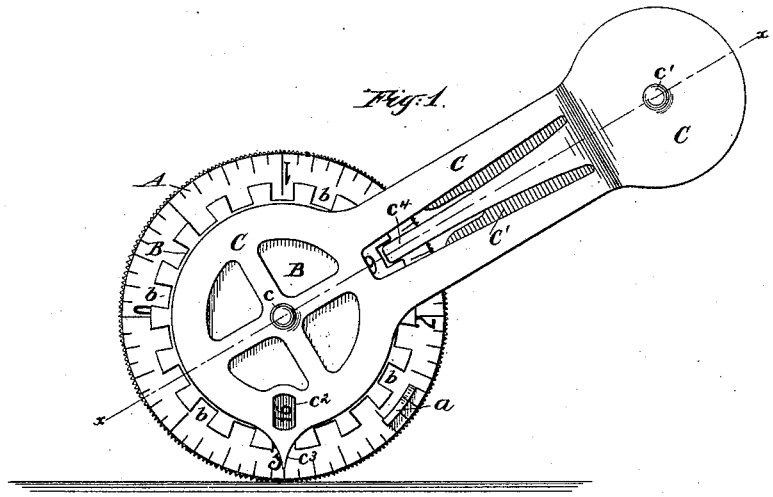
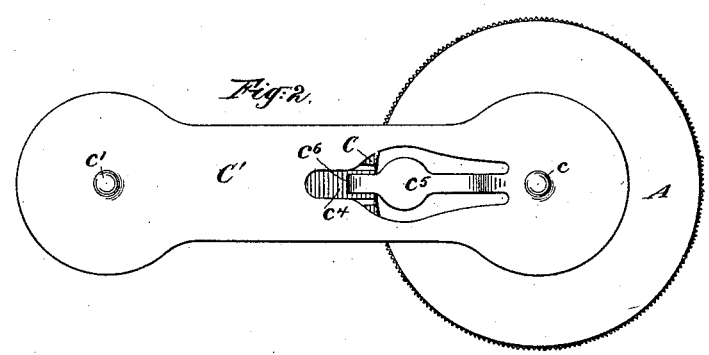
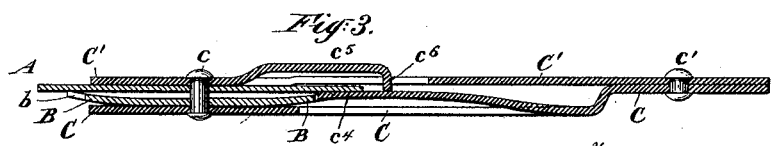
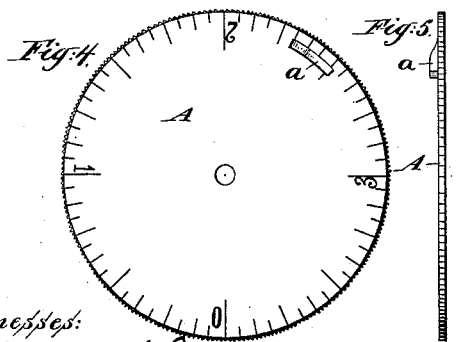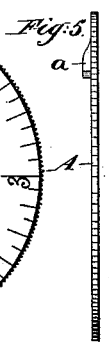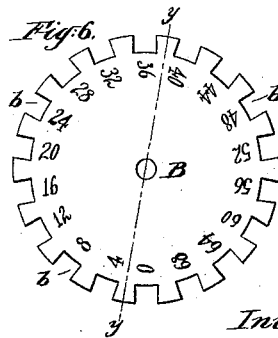
Witnesses:
William Lutz
R. Joste.
Inventor:
Robert F. Gillin,
by his attorney
Charles R. Searle.
THE NORRIS PETERS CO., PHOTO-LITHO., WASHINGTON, D. C.

UNITED STATES PATENT OFFICE.

ROBERT F. GILLIN, OF BROOKLYN, NEW YORK.

ROTARY MEASURE.

SPECIFICATION forming part of Letters Patent No. 468,318, dated February 2, 1892.

Application filed March 27, 1891. Serial No. 386,610. (No model.)

*To all whom it may concern:*

Be it known that I, ROBERT F. GILLIN, a citizen of the United States, and a resident of Brooklyn, in the county of Kings and State of New York, have invented a certain new and useful Improvement in Measuring Devices, of which the following is a specification.

This invention relates more particularly to that class of measuring devices which have as their main feature a graduated disk adapted to travel on the surface to be measured; and my improvement has for its object the production of a very exact instrument in a cheap and simple form with few parts. It is particularly suited for carrying in the pocket, but manifestly may be made in larger sizes and applied to all the purposes for which measuring-wheels are used.

My device may be said, briefly, to consist of a traveling disk graduated in inches and fractions thereof to agree with its actual circumference, a superimposed disk of less diameter in frictional contact with the traveling disk and so constructed as to expose a numeral for every complete revolution of the latter, and a suitable holding-plate embodying a pointer, a tongue for checking the recording-disk at each revolution of the traveling disk, and means for throwing such tongue out of connection when it is necessary to reset the disks at zero.

The accompanying drawings form a part of this specification and represent what I consider the best form of the invention.

Figure 1 is an elevation showing the front face of the device. Fig. 2 is a similar view showing the back face. Fig. 3 is a longitudinal section on the line $x\,x$ in Fig. 1. The remaining figures show parts detached. Fig. 4 is a face view. Fig. 5 is an edge view. Fig. 6 is a face view, and Fig. 7 is a section on the line $y\,y$ in Fig. 6.

Similar letters of reference indicate the same parts in all the figures where they appear.

A is the main or traveling disk, milled or slightly serrated on its periphery to enable it obtain a sufficient hold upon the surface to be measured and avoid slipping. Its entire circumference is graduated on one face in inches and fractions thereof. In the form shown one complete revolution of the traveling wheel will measure four inches.

Superimposed upon the disk A and turning upon the same center is a recording-disk B, of such less diameter as will properly clear the graduation-marks and figures on the traveling disk and having its edge divided into evenly-distributed rectangular notches $b\,b$. Adjacent to each notch is a numeral increasing by fours at each succeeding notch from zero to sixty-eight, each notch representing one revolution of the traveling disk. This notched disk is "dished" or concaved on its inner face, so that its edge is in strong frictional contact with the face of the traveling disk, the force tending to separate the two disks being resisted by the center rivet, firmly set in the frame or holding-plates.

C C′ are two holding-plates bound together at their forward ends, with the disks A and B between them, by a pin or rivet $c$, upon which the disks rotate. These plates are fastened together at their rear ends, which project any required distance to form a shank or handle, by another rivet $c'$. That part of the plate C which overlies the disk B is made open-work and is also provided with a slot $c^2$, which discloses the numerals on the disk as they are successively presented, and at the same point, projecting downwardly from the plate, is a point or finger $c^3$, extending nearly but not quite to the periphery of the disk A to act as an indicator in connection with the graduations on the latter. Longitudinally in the handle lies a spring-tongue $c^4$, stamped out and formed by the same dies that cut the other portions of the plate C, the free end of which overlaps the edge of the disk A and projects into one of the rectangular notches $b$ in the edge of the disk B. The rear plate C′ is of nearly the same contour as the plate C, and, like the latter, is cut from a sheet of thin metal in a single pair of dies. It is formed with a spring-arm $c^5$, which acts through its bent end $c^6$ to raise the tongue $c^4$ out of engagement with the notch $b$ when it is pressed forcibly by the user's finger. Thus conditioned the disks may be rotated together and the device set at zero. Upon relaxing the pressure of the finger the tongue $c^4$ again engages one of the notches $b$ and the device is ready to be used in measuring. The traveling disk A has a sloping or cam-like projection $a$ struck up or otherwise formed upon its front face, near the periphery, which as the traveling disk rotates will pass under the tongue $c^4$ and lift it out of the notch $b$ in which it is engaged. Now the friction between the disks A and B will cause the latter to travel with the former until the rear end of the projection $a$ passes from under the tongue and allows it to fall. The projection is made just long enough so that the space between two notches on the disk B will travel under the tongue before the latter is released and falls into the succeeding notch, and thus holds the disk B until another complete revolution of the disk A again presents the projection under the tongue and the action is repeated, adding four to the number of inches measured for each notch thus engaged.

The operation of my measuring-wheel will be readily understood from the foregoing and the drawings; but I may further explain that, having brought both the disks to indicate 0 or zero at the slot $c^2$ and finger $c^3$, it is only necessary to place this point at one end of the line to be measured, and, pressing lightly, roll the traveling disk along the surface to the other extremity, following the line as exactly as possible. When this has been reached and the finger $c^3$ made to stand exactly over the end of the line, the instrument will show exposed in the slot $c^2$ a numeral indicating the number of inches measured by the complete revolutions of the disk A, to which amount must be added the inches and fractions of an inch, if any, indicated by the pointer $c^3$ on the graduations on the disk A. The sum is the exact measure of the distance traveled.

An important advantage to be derived from the described construction is that all the parts may be stamped out of thin sheet metal by suitable dies. I have in my experiments used thin steel of a low grade; but it will be understood that any other material will serve, so long as it possesses the required strength and elasticity. Gearing is dispensed with entirely and friction alone transmits the motion from the traveling to the recording disk. The friction may be increased by using a shorter rivet for the center $c$, or the disk B may be made more concave than here shown. The invention will serve successfully without the recording-disk B. In measuring with the instrument when so conditioned the user must count the number of revolutions made by the traveling disk A in traversing the line to be measured, multiply this number by four, and add the inches and fractions indicated on the traveling disk. The sum will be the distance measured. The sharp "click" made by the passage of the projection $a$ under the spring-tongue $c^4$ facilitates the counting. Each click indicates one revolution of the traveling disk. I prefer the form in which the measurement is recorded.

I claim—

1. In a measuring device, the holding-plates C C', the traveling disk A and recording-disk B, in strong frictional contact with each other, both mounted between said plates on the same center $c$, and means, as the tongue $c^4$, for engaging the recording-disk, all substantially as herein specified.

2. In a measuring device, the holding-plates C C', held together by the rivet $c$, the traveling disk A and the concaved recording-disk B, having notches $b$, engaged by the spring-tongue $c^4$, and means, as the projection $a$, for raising the tongue clear of the notch and engaging in the next notch at each revolution of the traveling disk, substantially as herein specified.

3. In a measuring device, the holding-plates C C', the traveling disk A, recording-disk B, in strong frictional contact with the latter, and between said plates a spring-tongue $c^4$, engaging the recording-disk, in combination with each other and with the spring-arm $c^5 c^6$ for disengaging the tongue at will, substantially as herein specified.

4. In a measuring device, the plate C and spring-tongue $c^4$, formed in one therewith, and the plate C', having the spring-arm $c^5 c^6$ formed in one therewith, in combination with each other and with the traveling disk A, having the projection $a$, notched recording-disk B, and rivets $c c'$, all arranged substantially as herein specified.

5. In a measuring device, the holding-plates C C', rivet $c$, and spring-tongue $c^4$, in combination with the traveling disk A, having the projection $a$, all arranged to serve substantially as herein specified.

In testimony that I claim the foregoing as my invention I have signed my name, in presence of two witnesses, this 25th day of March, 1891.

ROBERT F. GILLIN.

Witnesses:
A. G. HYDE,
E. CUDLIPP.